United States Patent [19]

Cheney et al.

[11] 4,168,328

[45] Sep. 18, 1979

[54] PRESERVED FOOD PRODUCT AND PROCESS

[75] Inventors: Peter A. Cheney, Leicester; John S. Robertson, Stamford, both of England

[73] Assignee: Mars Limited, London, England

[21] Appl. No.: 806,315

[22] Filed: Jun. 13, 1977

[30] Foreign Application Priority Data

Jun. 17, 1976 [GB] United Kingdom ............... 25162/76

[51] Int. Cl.$^2$ ........................... A23B 4/12; A23L 3/00
[52] U.S. Cl. ......................................... 427/7; 426/56; 426/61; 426/321; 426/332
[58] Field of Search .................. 426/7, 32, 39, 42, 43, 426/46, 56, 59, 61, 583, 321, 332

[56] References Cited

U.S. PATENT DOCUMENTS

| | | | |
|---|---|---|---|
| 2,744,827 | 5/1956 | Mattick | 426/61 X |
| 3,096,177 | 7/1963 | Ariyama | 426/46 |
| 3,269,842 | 8/1966 | Mayer et al. | 426/43 |
| 3,743,516 | 7/1973 | Lundstedt et al. | 426/39 X |
| 3,794,739 | 2/1974 | Lee et al. | 426/56 X |
| 3,937,814 | 2/1976 | Nickerson et al. | 426/61 X |

*Primary Examiner*—Robert A. Yoncoskie
*Attorney, Agent, or Firm*—Davis, Hoxie, Faithfull & Hapgood

[57] ABSTRACT

The invention relates to the long term stabilization of proteinaceous food products both for human and for animal consumption, having a moisture content exceeding 50% and preserved against microbiological spoilage by a pH value of 4.5 or below. The long term stabilization of such products is enhanced by the presence of viable homofermentative acid producing organisms, notably lactic bacteria, together with available fermentable carbohydrate. In the preferred process the pH value of a proteinaceous product is reduced to a value in the range 5.0 to 4.0 and fermentation of the bacteria is then brought about, whereby the pH value of the product attains a final value not exceeding 4.5, if necessary with a lowering of pH value by the action of the bacteria. In preferred embodiments of the process a food grade acid is added to reduce the pH of the product to the range 4.5 to 4.0 and the final pH value of the product lies in the range 4.3 to 3.8.

8 Claims, No Drawings

PRESERVED FOOD PRODUCT AND PROCESS

The present invention relates to preserved food products and in particular to microbiologically stable products containing edible proteinaceous solids in aqueous medium.

Compositions comprising particles or pieces of meat or other edible protein solids in a gelled or thickened aqueous medium are well known, in both human and animal food contexts, for example as brawns and meat-in-jelly or meat-in-gravy products. Such products, however, are not ordinarily shelf-stable and can only be stored by special measures, usually by sterilization within sealed containers, as by canning.

It is possible to stabilize protein food products by reducing their water activity by the addition of water-soluble substances or humectants, but this is generally only practicable with products of intermediate moisture content, for example from 15 to 45%, since excessive concentrations of such substances are undesirable from the standpoint of either dietetics or palatability.

It is also possible to achieve microbiological stabilization of protein food products by adjusting their pH to a suitably acid value, for example below pH 4.5. Often however, protein products stabilized by an acid pH value deteriorate after a time and it is an object of this invention to provide means for enhancing the long term storage life of acid protein products of high moisture content.

In accordance with this invention a proteinaceous food product of high moisture content, say more than 50% by weight, and having a pH not exceeding 4.5, contains sufficient viable acid-producing bacteria and fermentable carbohydrate to enhance its long-term microbiological stability.

Further in accordance with this invention there is provided a method enhancing the long term microbiological stability of proteinaceous food products of high moisture content, which comprises adjusting the pH value of the product to below 5.0 and adding a viable acid-producing micro-organism, more especially lactic acid bacteria, in sufficient quantity to maintain the pH of the product below 4.5, and preferably between 3.8 and 4.3.

This invention rests upon the observation that enhanced micro-biological stability is achieved by the inclusion of a lactic acid producing inoculum and that additional stability results where the bacteria exhibit at least some metabolic activity usually accompanied by some lowering of the pH of the product. The presence of viable homofermentative acid lactic acid producing bacteria provide additional stability in the product which resists the harmful effects of mechanisms capable of increasing the pH value of the product, for example, high buffering capacities of ingredients or contamination by alkaline agents.

The reason for this additional stability is not fully understood but appears to require some degree of metabolic activity of the bacteria in the product. The product should accordingly contain the nutrients available for bacterial growth, especially fermentable carbohydrate and nitrogenous nutrients. The latter may be afforded by the protein source, for example with many meaty materials, but nitrogenous nutrients such as peptone may be added where required, for example where the product is based on vegetable protein.

The invention is particularly useful with proteinaceous products prepared from raw materials containing high initial contamination levels of sporulating bacteria capable of anaerobic growth accompanied by the vigorous evolution of carbon dioxide.

In the past, heat processing akin to sterilization has often been used to reduce the microbiological contamination of such raw materials. The necessity for such heat processing is avoided by the process of this invention because the stability achieved by the presence of active lactic bacteria is sufficient to overcome the higher degree of contamination in this type of raw material. This is of particular interest since where edible grade materials are employed pasteurization is not a legal requirement and heat processing can thus be kept to a minimum.

We have conducted experiments in which we have taken three similar formulae and obtained a low pH by three methods:

1. Direct and total acidification to an equilibrium pH of below pH 4.0, the relevant inoculum being added to the formulation after the acid.
2. Partial acidification to an initial pH of approximately pH 4.5 followed by a fermentation to a final pH of approximately 4.0.
3. Fermentation to a pH of approximately 4.0 without addition of extraneous acid.

The stability criteria used to monitor the experiments were:

(a) pH
(b) Gas evolution as measured by a manometer system.

Two experiments of this type have been carried out, one utilizing the gravy components of a typical product formulation and the other a more complete formulation (i.e. gravy + dried greaves.)

| Gravy formulation | % by weight |
|---|---|
| Gelatin | 9.06 |
| Glucose ('Trudex') | 9.06 |
| Potassium sorbate | 1.51 |
| Caramel | 3.02 |
| Erythrosine | 0.38 |
| Carob gum | 0.76 |
| Water | 76.26 |

Peptone was used at 0.1% of the mix and phosphoric acid at the required level to obtain the initial indicated pH values. The balance was made up by the addition of water. Table I shows the results obtained.

Table I

| Sample | Initial pH | 24 hours Gas | 24 hours pH | 72 hours Gas | 72 hours pH | 7 days Gas | 7 days pH | 5 months Gas | 5 months pH |
|---|---|---|---|---|---|---|---|---|---|
| Gravy + peptone + water (no inoculum) | 6.1 | ++[(1)] | 5.7 | — | 4.6 | 0 | 4.1 | 0 | 4.1 |
|  | 6.2 | ++ | 5.7 | — | 4.3 | +++ | 4.3 | +++ | 4.3 |
| Gravy + | 6.4 | 0 | 4.3 | 0 | 4.0 | 0 | 4.0 |  | 4.0 |

Table I-continued

| Sample | Initial pH | 24 hours Gas | 24 hours pH | 72 hours Gas | 72 hours pH | 7 days Gas | 7 days pH | 5 months Gas | 5 months pH |
|---|---|---|---|---|---|---|---|---|---|
| inoculum + peptone + water | 6.7 | 0 | — | 0 | 4.0 | 0 | 4.0 | 0 | 4.0 |
| Gravy + inoculum + peptone + acid | 3.6<br>3.9 | +<br>+ | 3.6<br>3.8 | +++<br>+++ | 4.5<br>4.5 | (2)Too much gas | | (2)Too much gas | |

(1)One or more symbols '+' signify the presence and level of gas
(2)Excessively large for measurement At 5 months of age the results indicate that where an inoculum of *L. casei* was used exclusively to lower the pH of the sample, the product remained stable.

Where no inoculum was added or the pH of the sample had been greatly reduced by a large addition of acid such that no fermentation had taken place, then the product did not remain microbiologically stable despite similar terminal pH values.

The gravy formulation and the peptone and acid additions were as described in relation to the previous experiments.

Greaves, gravy and inoculum were used at 25.73%, 29.40% and 4.4% respectively. Water was used to achieve the balance on 100%. The results are shown in Table II.

Table II

| Sample | Initial pH | 24 hours Gas | 24 hours pH | 72 hours Gas | 72 hours pH | 7 days Gas | 7 days pH | 5 months Gas | 5 months pH |
|---|---|---|---|---|---|---|---|---|---|
| Greaves + gravy + peptone | 6.2<br>6.2 | 0<br>+++ | 6.4<br>6.6 | +++<br>+++ | 4.5<br>4.5 | 3Not done | | 3Not done | |
| Greaves + gravy + inoculum | 6.1<br>5.8 | 0<br>0 | 3Not done<br>Not done | 0<br>0 | 4.0<br>4.0 | 0<br>0 | 4.0<br>4.0 | 0<br>0 | 4.0<br>4.0 |
| Greaves + gravy + inoculum + acid | 4.3<br>4.3 | 0<br>0 | 4.6<br>4.7 | 0<br>0 | 4.0<br>4.1 | 3Not done<br>0 | 3.8<br>3.8 | +++<br>0 | 3.8<br>3.8 |

3Not tested.

The results indicate the additional stability afforded to a moderately acidified formulation by the inclusion of an inoculum which undergoes at least some metabolic activity in the course of lowering the pH of the system.

A further experiment was conducted wherein two products were prepared as follows:

| Gravy Ingredients | % of Gravy (by weight) |
|---|---|
| Glucose | 7.0 |
| Sodium tripolyphosphate | 0.5 |
| Carob gum | 1.0 |
| Potassium sorbate | 0.4 |
| Caramel | 1.5 |
| Erythrosine | 0.5 |
| Water | 89.1 |

Beef lung was cooked at 121° C. for 10 minutes and used in conjunction with the above gravy to prepare the following products:

| Product A (Fermented) % by weight | Ingredient | Product B (Acidified) % by weight |
|---|---|---|
| 70.0 | Lung | 70.0 |
| 25.6 | Gravy | 25.6 |
| — | Phosphoric acid | To initial pH 3.0 |
| 4.4% | Inoculum | — |
| Initial pH 6.4 | | |

Both products were packed in re-sealable plastic tubs and incubated at 30° C. for 24 hours. The pH values at this point in time were:
Product A—4.3
Product B—4.0

The pH values of Product B were variable through the volume owing to localised high buffering capacity areas. Such phenomena can cause problems in achieving a desired rate of pH fall throughout the whole product.

Samples of both Products A and B were then neutralised to pH 5.0 with sodium hydroxide and incubated for 24 hours. Sample A returned to pH 4.0 but sample B equilibrated at pH 4.5, a level regarded as somewhat high by those skilled in the art.

In the preferred practice of this invention, sufficient food grade acid is added to the product to attain initial stability, preferably to a pH value of from 5.0 to 4.0, and the inoculum of lactic bacteria then added before the product is packaged.

Typical products prepared in accordance with this invention contain particles or pieces of protein tissue or other solids and an aqueous phase which may be thickened or gelled as desired, and have a protein content of 6 to 20% by weight, a fat content of 3 to 12% by weight and a moisture content of 65–95%.

The product preferably has a pH in the range 3.5–4.5 and should be maintained under antimycotic conditions usually by the inclusion of an antimycotic, for example sorbic acid compounds such as potassium sorbate, benzoates such as p-hydroxy benzoate or a mixture of the two.

Any food grade acid capable of producing an effective reduction in pH value of a meaty or other solid protein mix can be used. Examples include acceptable mineral acids, such as phosphoric acid, and organic acids such as lactic or citric acid. When a strong acid is used, direct addition of acid may bring the pH already below 4.5. When a relatively weak acid is used, it may bring about only a partial reduction in pH value to the desired final level, e.g. to below pH 5.0, the final reduction being brought about by fermentation. In this case, however, incubation is not necessary so that the convenience of the method of this invention is not lost.

A thickener may be included in the aqueous phase to provide an acceptable 'gravy'. Examples of suitable thickeners include gums such as Carob gum, and starch and cereal products such as flour.

As proteinaceous tissue in the product of this invention may be used, and by this term is thus meant to be included, any edible, solid, ordinarily insoluble protein tissue, notably traditional meats, including fish or poultry, offals, other animal protein sources such as dried greaves, vegetable protein materials and structured or textured proteins. Meaty materials may be pasteurized or sterilized, as may be required by current food regulations or as demanded in achieving desirable microbiological safety standards.

Apart from the proteinaceous material, or other solid foodstuff, fat moisture and thickener, the product will usually contain residual fermentable carbohydrate, and may also contain vitamins or other nutritional supplements, colouring agents, antioxidants, antimycotics, preservatives or other additives.

In putting the invention into practice, a solution may be prepared with desired amount of water and containing a thickener, any desirable calcium or other metal ion, and fermentable substances additional to any already present in the other ingredients such as fermentable carbohydrate, e.g. glucose or lactose, and optionally an organic nitrogen source, and preferably also an antimycotic. The solution may be heated to dissolve the soluble substances, but should then be cooled before a culture of an acid producing micro-organism is added.

The solution, which will ordinarily have a pH in the region of 6, is then mixed with the solid foodstuffs, which may be previously prepared and pasteurized mix of meats or meat by-products, but may also include or consist of vegetable protein in a suitably prepared form. The latter need not be pasteurized in the manner necessary in the case of meats. The protein materials may be finely divided into particles, for example by grinding, but more usually will be in the form of minced or chopped pieces which, at least in the case of pasteurized meat chunks, are preferably not larger than 3.0 cm$^3$. This limit is less significant in the case of sterilized materials or vegetable protein materials such as textured vegetable protein, but the pieces should not be larger than is convenient for filling the containers to be employed or for acceptance by the consumer.

When the solution has been mixed with the meats, which operation will effect some of the necessary cooling of the hot solution, sufficient food grade acid is mixed in to give a pH below 4.5 or, when fermentation is relied upon to bring the product to the final pH to a pH below 5.0.

At this stage the culture of the selected acid-producing organism is conveniently added. Preferred micro-organisms are homo-fermentative lactic acid-producing bacteria such as *Lactobacillus Casei, L. Bulgaricus, Streptococcus lactis* and *S. thermophilus,* either singly or in any combination. It has been found most convenient to add the micro-organisms in the form of an inoculum, in a quantity depending on the time necessary for fermentation to the final pH and on the strain of micro-organisms used. The quantity will most usually be in the range of 1 to 10% by weight of the total composition as packed. Other forms of culture, for example freeze-dried starter cultures, can also be used.

The resultant mixtures may be packaged in transparent plastics resealable containers. When the final pH has not been achieved by the direct acid addition, fermentation will then proceed in the containers at ambient temperature until the terminal value is reached.

The products prepared in this way may be found to possess a good meat-in-gravy appearance with a fresh meaty aroma. The food is highly acceptable to pet animals.

The following examples illustrate the practice of the invention. All percentages are by weight unless the context otherwise requires.

EXAMPLE 1

A gravy was prepared according to the following formulation:

| | |
|---|---|
| Carob gum | 100 g |
| Potassium sorbate | 200 g |
| Caramel | 400 g |
| Erythrosine solution | 100 g |
| Cheese powder | 600 g |
| Glucose | 1200 g |
| Water | 10100 g |
| English baker's flour | 800 g |

The colouring agents, potassium sorbate, glucose and cheese powder were added to approximately half of the total amount of water. The mixture was agitated vigorously, the carob gum added, followed by the English baker's flour, and the total heated to 100° C. and held for five minutes. 3.5 Kg of dried greaves was added to 5.5 Kg of the hot gravy followed by the remainder of the water, 122 g of phosphoric acid and 600 g of an inoculum broth of *L. casei.* The whole mixture was stirred thoroughly prior to packaging in re-sealable plastic tubs of the type used in yoghurt manufacture. The resultant product contained viable *L. casei* and had a pH of 4.0. It was stable at ambient temperatures for considerable periods of time.

The inoculum of *Lactobacillus casei* was prepared by growing the organism in MRS broth for 20 hours at 30° C. whereupon the cell density obtained was approximately $10^9$ CFU/ml.

EXAMPLE 2

This example demonstrates the use of an organic acid, fresh meats and a partial reduction in pH due to the metabolic activity of the lactic acid producing micro-organisms.

Sheep lung was allowed to condition prior to comminution by mincing through a Hobart mincer fitted with a 4.0 mm plate and a four bladed cutter. The meats were cooked at 121° C. for 40 minutes. A gravy was prepared according to the following formulation:

|  | % gravy |
|---|---|
| English baker's flour | 6.08 |
| Carob gum | 0.76 |
| Glucose (Trudex) | 9.12 |
| Cheese powder | 4.56 |
| Caramel | 2.28 |
| Potassium sorbate | 0.40 |
| Water | 73.15 |

The gravy was prepared as described previously except that all the water was used initially.

2.8 Kg of gravy was added to 5.2 Kg of meats. The two were mixed well together, cooled at 35° C. and 80 g of citric acid was added prior to addition of an inoculum of L. casei (4.4% of the total pack). The whole mixture was mixed well together, the pH being 4.9, and packaged. No incubation was attempted but after 24 hours the product had a pH of 4.0 and after 4 days 3.8.

The product had a meat in gravy appearance and an attractive meaty aroma.

EXAMPLE 3

This example demonstrates the use of a new starter culture, Pediococcus cerevisiae and dried greaves.

| Gravy Formulation: | % by weight | Total Formulation: | % by weight |
|---|---|---|---|
| Xanthan gum | 1.56 | Gravy | 29.00 |
| Glucose (Trudex) | 9.34 | Greaves (dried) | 25.38 |
| Potassium sorbate | 1.56 | Water | 39.88 |
| Caramel | 4.28 | Phosphoric acid | 1.09 |
| Carmoisine | 0.016 | Carob gum | 0.36 |
| Water | 78.58 | Pediococcus cerevisiae (inoculum) | 4.35 |
| Cheese powder | 4.67 | | |

The gravy was prepared by suspending the ingredients in the water and boiling for 5 minutes with vigorous agitation.

The hot gravy was then pumped onto the dried greaves with stirring. The carob gum was added, followed by the water, all with mixing. The acid was added once the temperature had cooled to 25° C. and was followed by the inoculum.

The mixing was continued until all the ingredients were uniformly dispersed within the mixing vessel. The product was packaged and transferred to storage at a temperature above 8° C.

Initial pH of the product was 4.5 and the final pH after 24 hours storage was 4.1. The product was microbiologically stable

EXAMPLE 4

This example demonstrates the use of an alternative acid.

The formulations used were as described above (Example 3) but with tartaric acid used as an alternative to phosphoric acid.

The tartaric acid produced an initial pH in the formulation of 4.3 (this required 90 grams of the acid). The pH after 24 hours was 4.0. The product was microbiologically stable.

EXAMPLE 5

This example demonstrates the use of an alternative gelling system and the use of textured vegetable protein (TVP) in the formulation.

| Gravy Formulation: | % | Total Formulation: | % |
|---|---|---|---|
| Gelatin | 9.34 | Gravy | 29.00 |
| Carob gum | 0.72 | Greaves (dried) | 18.13 |
| Potassium sorbate | 1.56 | Water | 39.88 |
| Caramel | 4.28 | TVP (prehydrated at 100° C. and drained) | 7.25 |
| Carmoisine | 0.016 | Phosphoric acid | 1.09 |
| Water | 70.07 | Inoculum (L. casei) | 4.35 |
| Cheese powder | 4.67 | | |
| Glucose (Trudex) | 9.34 | | |

The same process was used as described in the previous examples.

The product possessed an initial pH of 3.9 and a final pH of 3.5. It was microbiologically stable.

We claim:

1. A microbiologically stable proteinaceous food product comprising pieces of edible protein solids selected from meat and textured vegetable protein in an aqueous phase, said aqueous phase having a pH value below 4.5 and said product having a moisture content exceeding 50% by weight, said product containing viable homofermentative predominantly lactic acid-producing bacteria together with available fermentable carbohydrate in amounts sufficient to enhance the long term microbiological stability of said food product.

2. A food product according to claim 1 wherein the bacteria have undergone active fermentation in the product.

3. A food product according to claim 1 containing food grade acid in quantity sufficient to lower the pH value of the product to at most 5.0 and wherein the pH value is lowered to its final value by the fermentative action of said bacteria.

4. A food product according to claim 1 having a pH value maintained substantially constant by the bacteria in the range 3.8 to 4.3.

5. A method of enhancing the long term microbiological stability of a proteinaceous food product of moisture content exceeding 50% comprising the steps of: preparing a mix comprising particles or pieces of edible protein solids and fermentable carbohydrate in an aqueous phase, adjusting the pH value of the aqueous phase to below 5.0, said mix further containing viable homofermentative lactic acid-producing bacteria in said aqueous phase in amounts sufficient to maintain by fermentation the pH of the product at a value below 4.5

6. A method according to claim 5 wherein sufficient food grade acid is added to the product to lower its pH value to below 5.0 and said viable culture of the bacteria is then added.

7. A method according to claim 6 wherein the food grade acid is added until the pH of the product is lowered to the range 4.5 to 4.0.

8. A method according to claim 6 wherein the product attains a final pH value in the range 3.8 to 4.3.

* * * * *